US012612942B2

(12) United States Patent
Steinberger et al.

(10) Patent No.: US 12,612,942 B2
(45) Date of Patent: Apr. 28, 2026

(54) DRIVETRAIN ASSEMBLY FOR AN ELECTRIC VEHICLE INCLUDING AN ELECTRICALLY CONDUCTIVE SHUNT WASHER

(71) Applicant: Schaeffler Technologies AG & Co. KG, Herzogenaurach (DE)

(72) Inventors: Markus Steinberger, Sagamore Hills, OH (US); David Burky, Massillon, OH (US); Rashid Farahati, Copley, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 243 days.

(21) Appl. No.: 18/387,012

(22) Filed: Nov. 3, 2023

(65) Prior Publication Data

US 2025/0149841 A1     May 8, 2025

(51) Int. Cl.
| | |
|---|---|
| *F16C 19/06* | (2006.01) |
| *F16C 19/52* | (2006.01) |
| *F16C 35/063* | (2006.01) |
| *F16C 35/067* | (2006.01) |
| *F16C 41/00* | (2006.01) |
| *H02K 5/173* | (2006.01) |

(52) U.S. Cl.
CPC ............ *F16C 19/06* (2013.01); *F16C 35/063* (2013.01); *F16C 35/067* (2013.01); *F16C 41/002* (2013.01); *H02K 5/173* (2013.01); *F16C 2380/26* (2013.01)

(58) Field of Classification Search
CPC ........ F16C 19/06; F16C 19/52; F16C 33/586;
F16C 35/063; F16C 35/077; F16C 41/002; F16C 2380/26; H02K 5/173; H02K 5/1732; H02K 5/1735; H02K 7/083; H02K 7/085
See application file for complete search history.

(56) References Cited

U.S. PATENT DOCUMENTS

| | | | |
|---|---|---|---|
| 2023/0261555 A1 * | 8/2023 | Arnault ................. | H02K 11/40 |
| | | | 310/71 |
| 2023/0383793 A1 * | 11/2023 | Kovacs ................. | F16C 41/002 |
| 2024/0271665 A1 * | 8/2024 | Giehl ..................... | F16C 19/26 |

FOREIGN PATENT DOCUMENTS

| | | | | |
|---|---|---|---|---|
| DE | 102015223509 A1 * | 3/2017 | ............ | F16C 41/002 |
| DE | 102017106695 B3 * | 4/2018 | .......... | F16C 33/7876 |

OTHER PUBLICATIONS

DE102015223509_Description.*
DE102017106695_Description.*

* cited by examiner

*Primary Examiner* — Phillip A Johnson
(74) *Attorney, Agent, or Firm* — Davidson Kappel LLC

(57) ABSTRACT

A drivetrain assembly for an electric vehicle is provided that includes a housing, a rotor shaft of an electric motor rotatable about a center axis, and a bearing rotatably supporting the rotor shaft with respect to the housing. The bearing includes a first race on the housing and a second race on the rotor shaft. The drivetrain assembly includes an electrically conductive shunt washer configured for creating an electrical path from the housing to the second race. The electrically conductive shunt washer includes a material including electrically conductive fibers.

20 Claims, 6 Drawing Sheets

DRIVETRAIN ASSEMBLY FOR AN ELECTRIC VEHICLE INCLUDING AN ELECTRICALLY CONDUCTIVE SHUNT WASHER

TECHNICAL FIELD

The present disclosure relates generally to drivetrain assemblies for electric vehicles, and more specifically to drivetrain assemblies for electric vehicles including electrically conductive shunt washers.

BACKGROUND

Drivetrain assemblies for electric vehicles, such as electric axles, have induced current in the rotor shaft. This is a result of rapid changes in stator winding voltage. To avoid damage in bearing raceways from electrical discharge the conductivity and electrical isolation properties of these bearings can be influenced. Some bearings receive nonconductive coatings. Others bearings receive integrated or parallel shunts depending on their location in the overall layout. Typical implementations for electrically conductive elements between stationary and rotating parts are fleece rings, conductive spring-loaded pins and conductive brushes.

SUMMARY

A drivetrain assembly for an electric vehicle is provided that includes a housing, a rotor shaft of an electric motor rotatable about a center axis, and a bearing rotatably supporting the rotor shaft with respect to the housing. The bearing includes a first race on the housing and a second race on the rotor shaft. The drivetrain assembly includes an electrically conductive shunt washer configured for creating an electrical path from the housing to the second race. The electrically conductive shunt washer includes a material including electrically conductive fibers.

In examples, the material axially contacts one of the inner race and the outer race.

In examples, the material contacts a circumferential surface of one of the rotor shaft and the housing.

In examples, the electrically conductive shunt washer includes a rigid support, the material being fixed to the rigid support.

In examples, the electrically conductive shunt washer contacts at least one of the housing and the outer race.

In examples, one of the rigid support and the material contacts at least one of the housing and the outer race.

In examples, the material contacts and the rigid support is spaced apart from a circumferential surface of one of the rotor shaft and the housing.

In examples, the material is fixed to the rigid support by an adhesive.

In examples, spaces are provided between the adhesive for the electrical path to flow between the material and the rigid support.

In examples, the material further includes a solid lubricant.

In examples, the solid lubricant is graphite and/or molybdenum disulfide.

In examples, the electrically conductive fibers are carbon fibers and/or metal fibers.

In examples, the material further includes supporting fibers and a binder.

In examples, material is a nonwoven material and the solid lubricant, the electrically conductive fibers and the supporting fibers are intermeshed together to form a base including pores, the binder being embedded in the base and filling the pores.

In examples, the supporting fibers are cellulose fibers and/or aramid fibers.

In examples, the material includes, by weight percent, 10 to 20% of the solid lubricant, 10 to 55% of the electrically conductive fibers, 5 to 30% of supporting fibers and 25 to 35% of a binder.

In examples, the electrically conductive shunt washer includes a plurality of fluid flow holes or grooves formed therein.

A method of constructing a drivetrain assembly for an electric vehicle for a motor vehicle is provided. The method includes rotatably supporting a rotor shaft of an electric motor for rotation about a center axis with respect to a housing by a bearing rotatably supporting the rotor shaft with respect to the housing. The bearing includes a first race on the housing and a second race on the rotor shaft, and installing an electrically conductive shunt washer on a circumferential surface of the rotor shaft. The electrically conductive shunt washer is configured for creating an electrical path from the housing to the second race. The electrically conductive shunt washer includes a material including electrically conductive fibers.

In examples, the method includes creating the material by: providing a base including a solid lubricant and electrically conductive fibers; saturating the base with a binder; and curing the binder.

In examples, the base further includes supporting fibers, the nonwoven material including, by weight percent, 10 to 20% of the solid lubricant, 10 to 55% of the electrically conductive fibers, 5 to 30% of supporting fibers and 25 to 35% of a binder.

BRIEF DESCRIPTION OF THE DRAWINGS

The present disclosure is described below by reference to the following drawings, in which:

FIG. 1b shows a perspective view of the electrically conductive shunt washer and bearing of FIG. 1a;

FIG. 2b schematically shows the arrangement of the adhesive fixing the material to the rigid support;

DETAILED DESCRIPTION

The present disclosure provides an electrically conductive shunt washer for creating a low resistance path for induced current in a rotor shaft of an electrical axle to prevent the induced current from electrical discharge machining (EDM) the bearing on the rotor shaft. Known solutions to create a low resistance path around the bearing may require large installation space (spring-loaded pins) or degrade/increase resistance over time (fleece rings, conductive brushes). The electrically conductive shunt washer of the present disclosure may solve these problems.

Figure 1A:
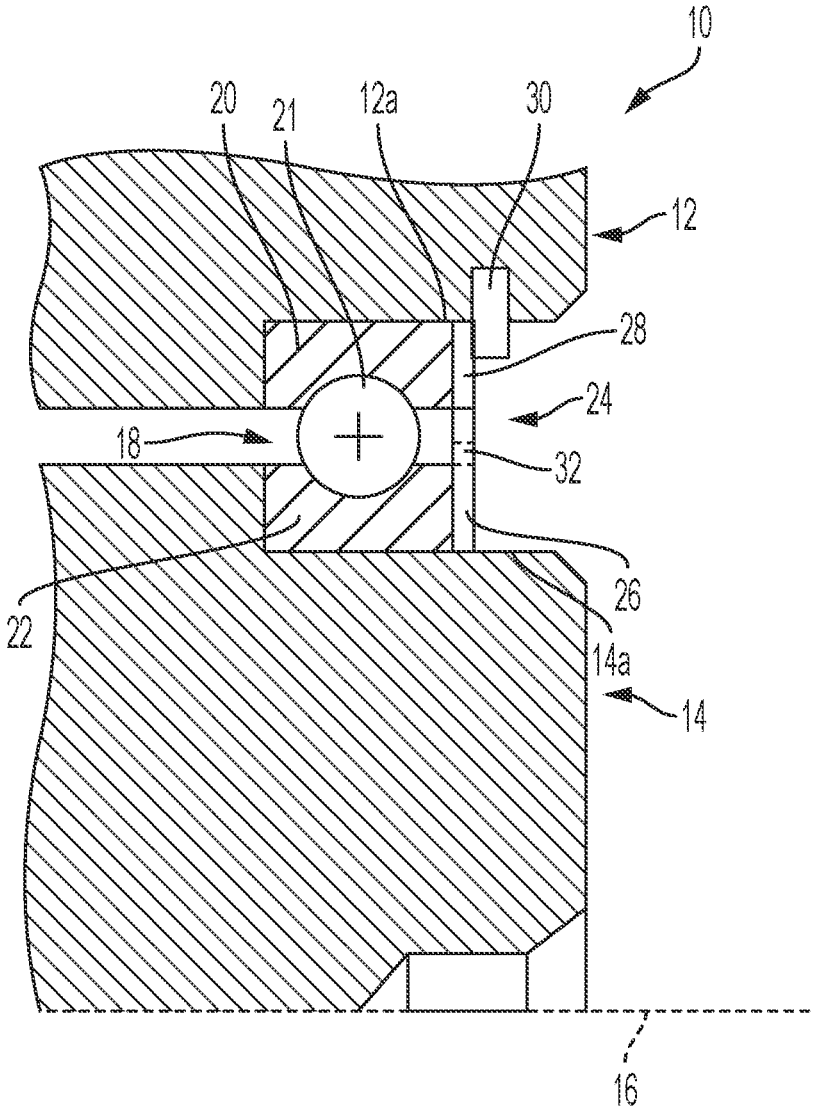
FIG. 1a shows a cross-sectional radially facing view of a drivetrain assembly for an electric vehicle including an electrically conductive shunt washer in accordance with the present disclosure.

FIG. 1a shows a cross-sectional radially facing view of a drivetrain assembly for an electric vehicle, which is in the form of an electric axle 10 including a housing 12, an electric motor rotor shaft 14 rotatable about a center axis 16 and a bearing 18 rotatably supporting the rotor shaft 14 with respect to the housing 12. In another example, the drivetrain assembly can be a hybrid module including an electric motor. Unless specified herein, the terms radial, circumferential, axial and derivatives thereof are used with respect to center axis 16. The bearing 18 includes a first race 20 and a second race 22, with rolling elements 21 being provided between races 20, 22. The first race 20 contacts a circumferential surface 12a of the housing 12 and the second race 22 contacts a circumferential surface 14a of the rotor shaft 14. In the example shown in FIG. 1a, the circumferential surface 14a is the outer circumferential surface of the rotor shaft 14 and the circumferential surface 12a is the inner circumferential surface of the housing.

The electric axle 10 further includes an electrically conductive shunt washer 24 arranged on a circumferential surface 14a of the rotor shaft 14 configured for creating an electrical path bridging the races 20, 22. In other words, electrically conductive shunt washer 24 is configured for creating a low resistance electrical path around the raceways via which rolling elements 23 contact races 20, 22k, to limit the flow of electricity to the rolling elements 23 and prevent sparks from being generated by the contact between the rolling elements 23 and the races 20, 22. The electrically conductive shunt washer 24 includes a material 26, which includes electrically conductive fibers, for contacting the circumferential surface 14a of the rotor shaft 14.

The material 26 is a ring-shaped sheet and is electrically conductive. The material 26 is configured for conducting currents at frequencies from 10 kHz to 1 MHz. The material 26 has a resistance of 40 to 60 Ohms at a current of 50 μA DC current and 1 to 20000 rpm of the rotor shaft 14.

Figure 1B:
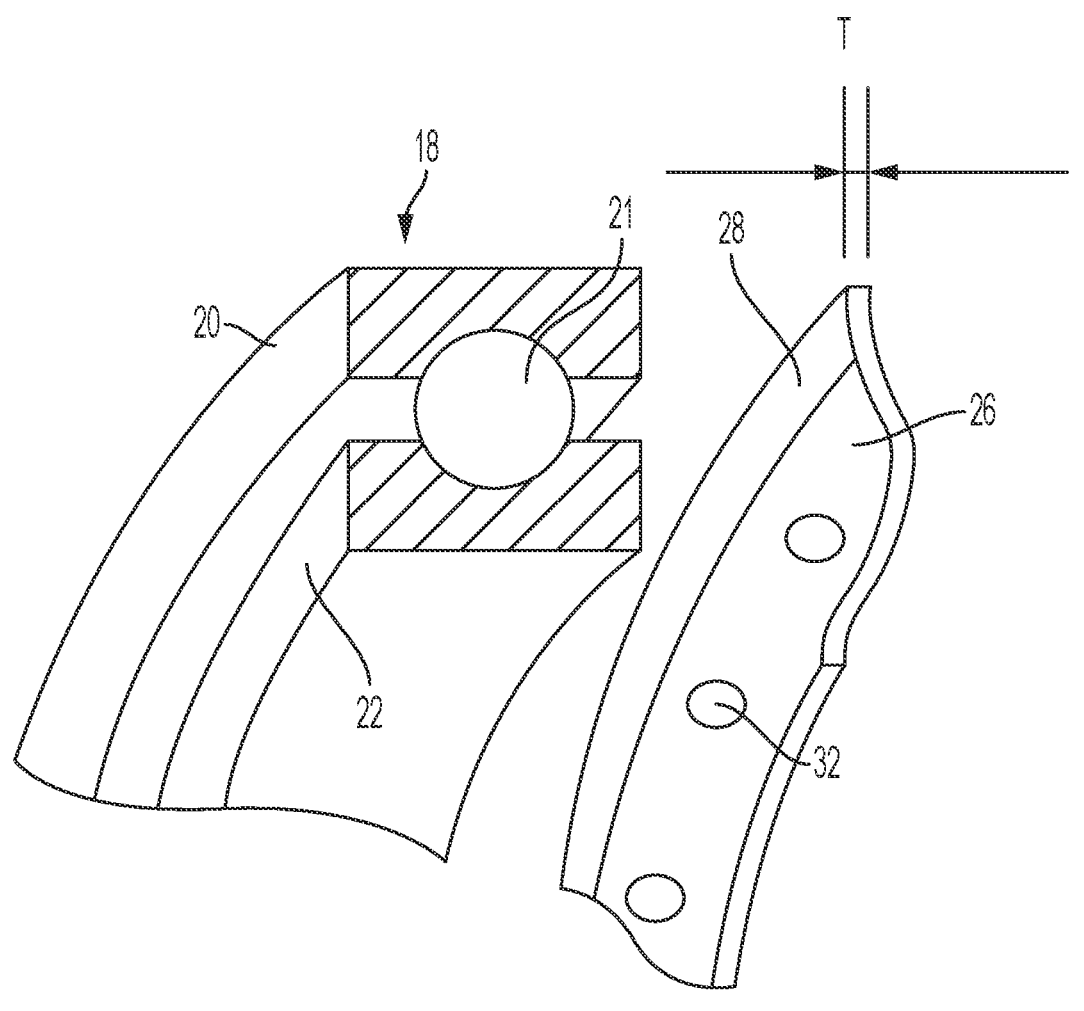

The electrically conductive shunt washer 24 also includes a rigid support 28, and the material 26 is fixed to the rigid support 28. Material 26 forms a rotor-side circumferential surface 24a of electrically conductive shunt washer 24 and rigid support 28 forms a housing-side circumferential surface 24b of electrically conductive shunt washer 24. The rigid support 28 contacts the circumferential surface 12a of the housing 12 and is spaced apart from the circumferential surface 14a of the rotor shaft 14. The rigid support 28 can be made of a metal including for example steel. In the example of FIGS. 1a and 1b, the material 26 and the rigid support 28 are continuous rings. The material 26 can be fixed to the rigid support 28 by an adhesive. To prevent the adhesive, which is electrically non-conductive, from blocking the electrical path, the adhesive is arranged such that electrical flow gaps are provided adjacent to the adhesive allowing direct contact between material 26 and rigid support 28, as discussed below with respect to FIG. 2b.

Material 26 includes two circumferential surfaces-a housing-side circumferential surface 26a, which in FIGS. 1a and 1b is an outer circumferential surface, and a rotor-side circumferential surface 26b, which in FIGS. 1a and 1b is an inner circumferential surface. Rigid support 28 includes two circumferential surfaces—a housing-side circumferential surface 28a, which in FIGS. 1a and 1b is an outer circumferential surface, and a rotor-side circumferential surface 28b, which in FIGS. 1a and 1b is an inner circumferential surface. Adhesive is applied to the housing-side circumferential surface 26a of material 26 and/or rotor-side circumferential surface 28b of rigid support 28, and surfaces 28a, 26b are joined together.

The material 26 includes a solid lubricant and electrically conductive fibers. The solid lubricant provides for low friction contact between electrically conductive shunt washer 24 and rotor shaft 14. The solid lubricant can be graphite and/or molybdenum disulfide. The electrically conductive fibers help provide a low resistance electrical path around the raceways 20, 22. The electrically conductive fibers can be carbon fibers and/or metal fibers. The metal fibers can be aluminum fibers and/or steel fibers.

The material 26 can further include supporting fibers and a binder. The solid lubricant, the electrically conductive fibers and the supporting fibers are intermeshed together to form a base including pores, and the binder can be embedded in the base and can fill the pores such that the material 26 is nonporous. The supporting fibers can be electrically non-conductive, and can be formed of cellulose fibers and/or aramid fibers. The binder can be phenolic resin.

In one advantageous example, the material 26 comprises, by weight percent, 10 to 20% of the solid lubricant, 25 to 45% of the electrically conductive fibers, 10 to 30% of supporting fibers and 25 to 35% of a binder. These percentages provide a construction that is low friction, electrically conductive and durable. In this example, the material 26 is a nonwoven material.

In other examples, the material 26 can be a woven fabric made from carbon fibers, or a nonwoven fabric made from carbon fibers. The nonwoven fabric made from carbon fibers can be a carbon paper or carbon felt. In other examples, material 26 can be formed or woven or nonwoven metallic meshes, which can be formed of titanium or stainless steel.

Electrically conductive shunt washer 24 is provided in an annular gap between the circumferential surfaces 12a, 14a of the housing 12 and rotor 14, and can be held in the annular gap by a snap ring 30 fixed in circumferential surface 12a of housing 12. To allow fluid to flow through shunt washer 24, the shunt washer 24 can include a plurality of holes 32 extending axially therethrough. Specifically, holes 32 are formed in material 26. As shown in FIG. 1b, which provides a perspective sectional view of bearing 18 and electrically conductive shunt washer 24, holes 32 are circumferentially spaced apart from each other. The material 26 can have an axial thickness T of 0.25 to 0.75 mm and the rigid support 28 can have an axial thickness of 0.25 to 0.75 mm.

A method can include creating the material 26 by providing a base including a solid lubricant, electrically conductive fibers and supporting fibers, then saturating the base with a binder and then curing the binder. More specifically, the solid lubricant, electrically conductive fibers and supporting fibers can be joined together in a pulping process to form the base. The pulping process can involve forming a mixture of the solid lubricant, electrically conductive fibers and supporting fibers submerged together in a liquid solution, then drying the mixture to remove the liquid. After the solid lubricant, electrically conductive fibers and supporting fibers are joined together by the liquid solution, the base includes a matrix formed by the solid lubricant, electrically conductive fibers and supporting fibers that define a network of voids. After the solid lubricant, electrically conductive fibers and supporting fibers are joined together, the base can be saturated with the binder, then cured.

After curing, material 26 can be joined to rigid support 28 by adhesive. Holes 32 can be cut into material 26 after curing, and before or after material 26 is joined to the rigid support 28.

A method of constructing the electric axle 10 can include rotatably supporting the rotor shaft 14, by the bearing 18, for rotation about the center axis 16 with respect to the housing 12. The bearing 18 can be slid into the annular gap between housing 12 and rotor shaft 14, with first raceway 20 being slid onto housing 12 and second raceway 22 being slid onto rotor shaft 14. Next, the method can include installing the electrically conductive shunt washer 24 on the circumferential surface 14a of the rotor shaft 14.

Figure 2A:
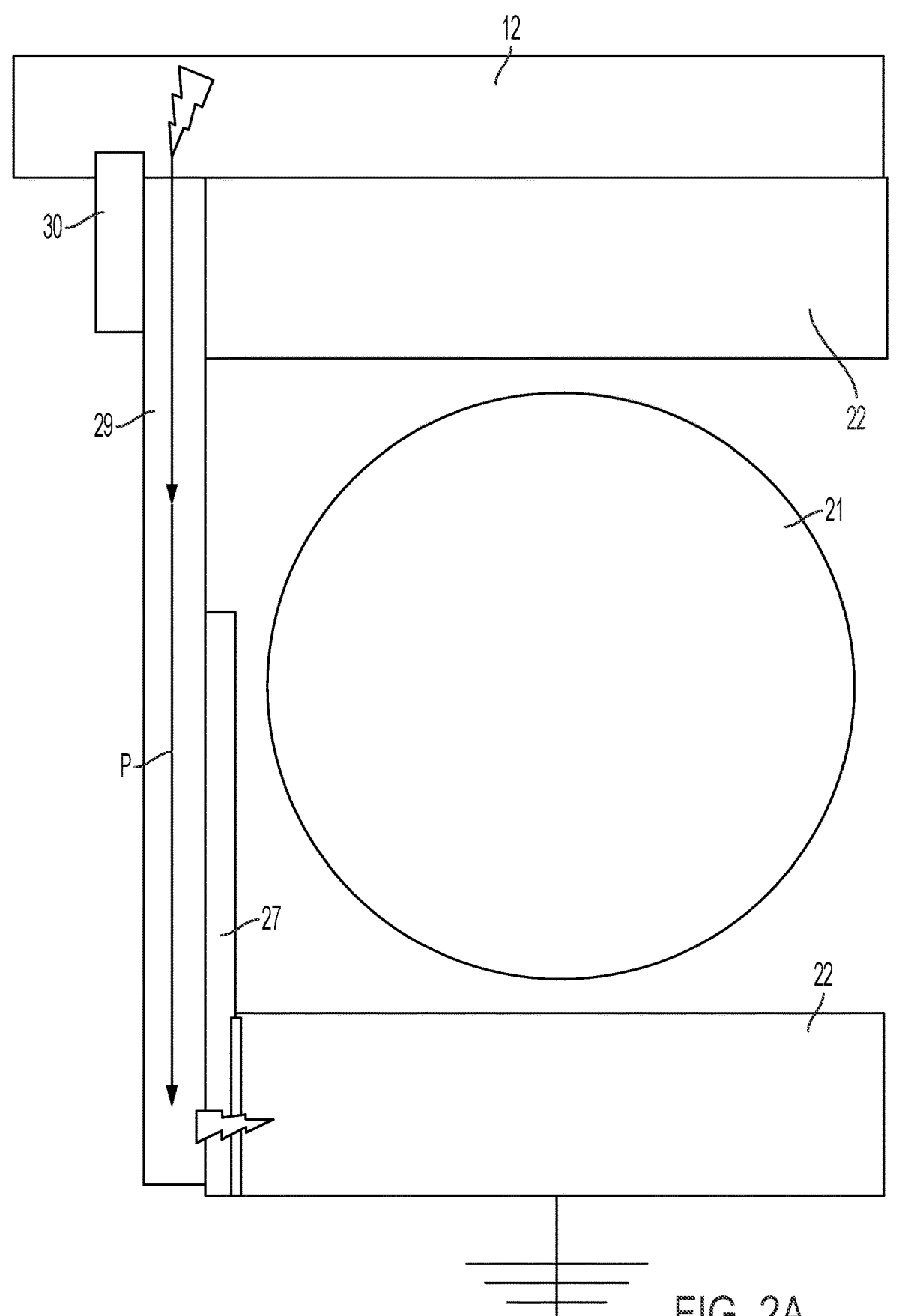
FIG. 2a shows a cross-sectional radially facing view of a drivetrain assembly for an electric vehicle, illustrating the electrical path between the housing and the inner race.

FIG. 2a shows a further example of an electrically conductive shunt washer 25 in accordance with the present disclosure, and illustrates the electrical path P through the electrically conductive shunt washer 25 from housing 12 to the inner race 22, instead of through rolling elements 21. While the electrical path P is shown flowing directly from housing 12 to the electrically conductive shunt washer 25, it can also flow from housing 12 to electrically conductive shunt washer 25 via outer race 20. The electrically conductive shunt washer 25 includes material 27, which has the same composition as material 26, and a rigid support 29, having the same composition as rigid support 28. The electrical path P flows from housing 12, to rigid support 29, to material 27 and then to inner race 22. Material 27 is axially fixed to rigid support 29, with axially facing surfaces of material 27 and rigid support 29 being joined together. Material 27 axially contacts inner race 22 and rigid support 29 axially contacts outer race 20. Electrically conductive shunt washer 25, at rigid support 29, is fixed to housing 12 by snap ring 30.

Figure 2B:
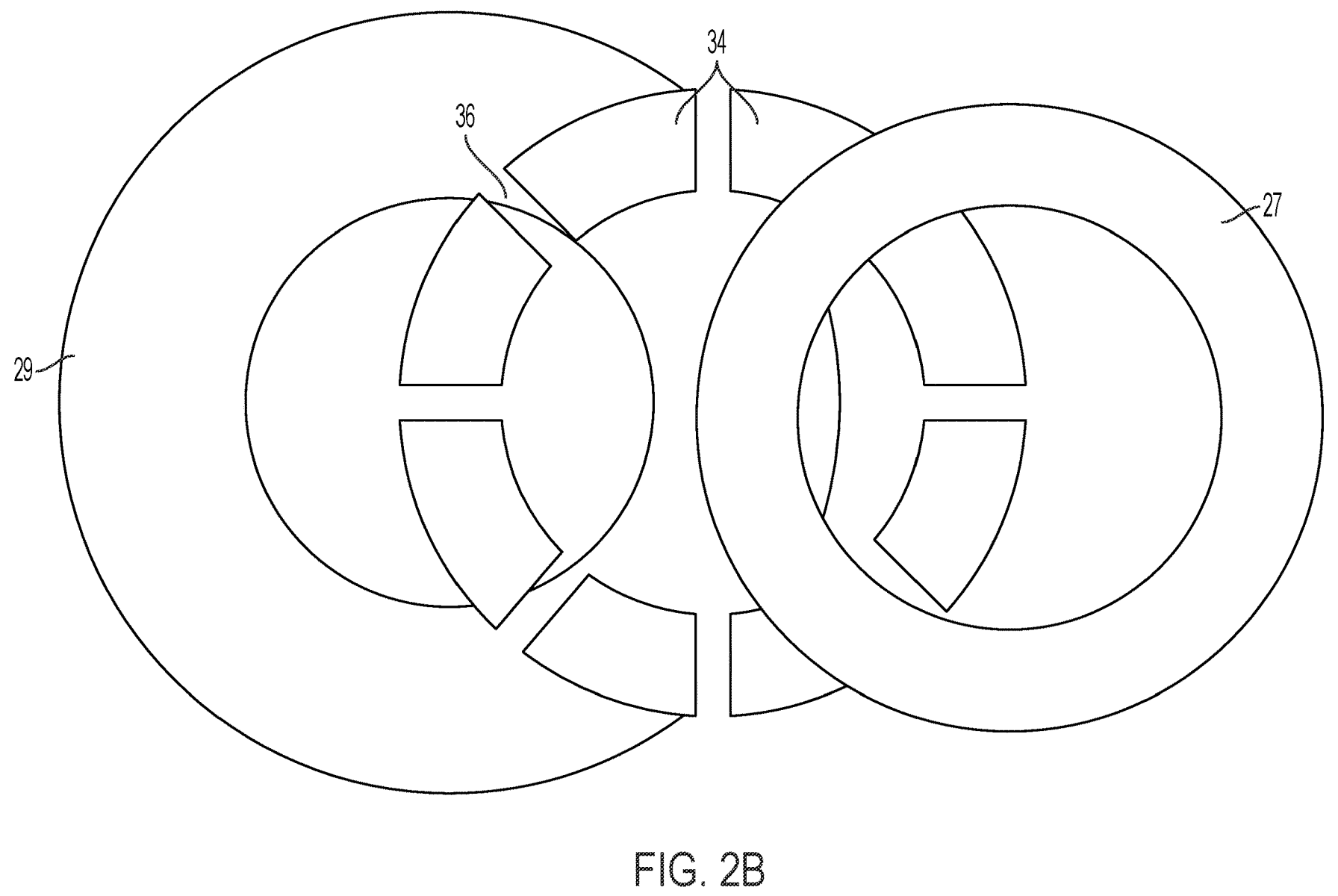

FIG. 2b schematically illustrates an example of how adhesive 34 can be arranged such that the adhesive 34, which is insulating, does not block the electrical flow from rigid support 29 to material 27. In particular, spaces 36 are provided between section of the adhesive 34 for the electrical path to flow between the material 27 and the rigid support 29, which can allow the axially facing surfaces of the material 27 and the rigid support 29 to axially contact each other at spaces 36.

Figure 2C:
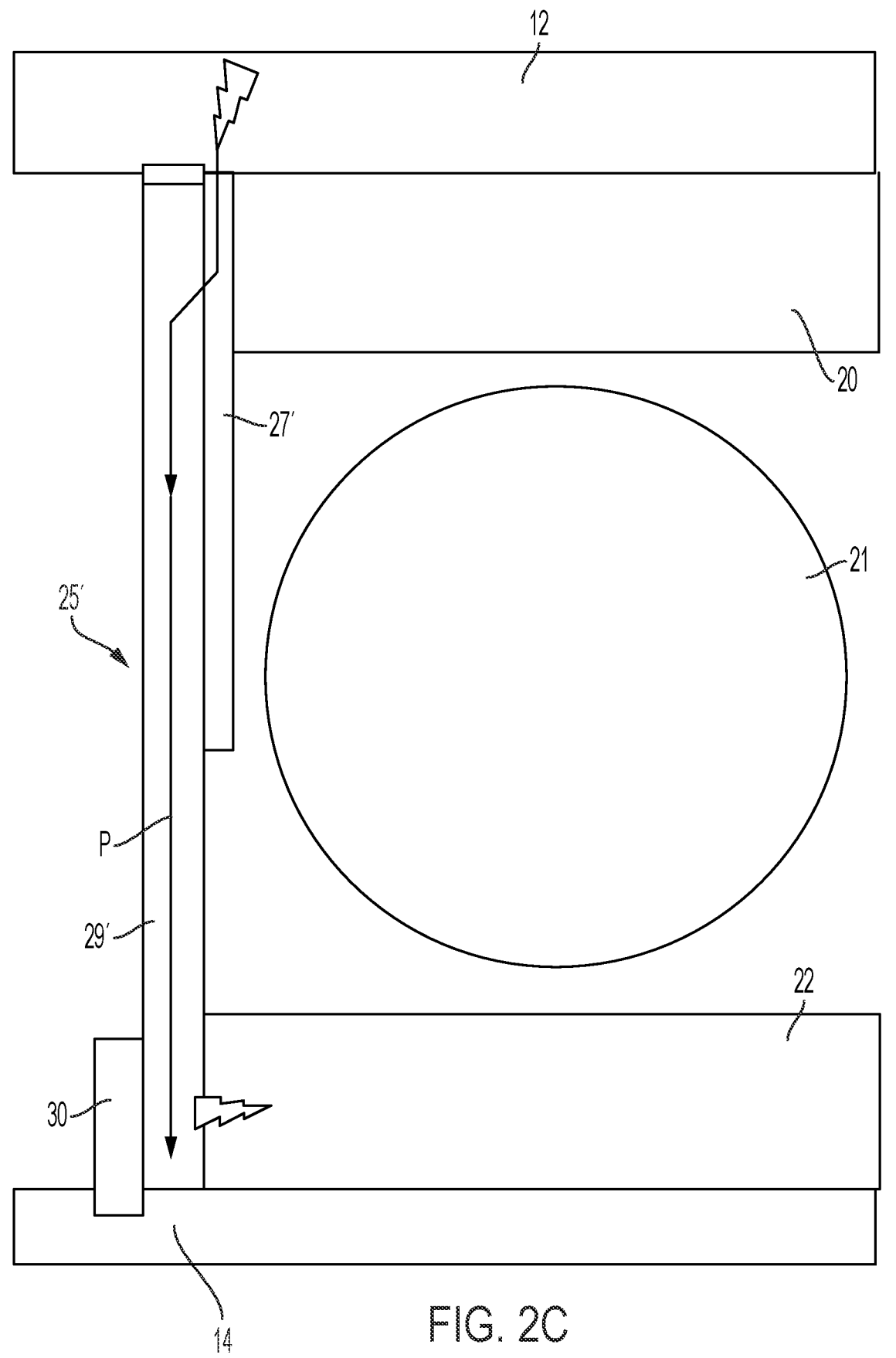
FIG. 2c shows a cross-sectional radially facing view of a drivetrain assembly for an electric vehicle, illustrating the material on the outer diameter.

FIG. 2c shows a further example of the arrangement an electrically conductive shunt washer 25. In FIG. 2b, the electrical path P flows from housing 12, to material 27', to rigid support 29', and then to inner race 22. Material 27' axially contacts outer race 20 and rigid support 29' axially contacts inner race 20. Electrically conductive shunt washer 25, at rigid support 29', is fixed to rotor shaft 14 by snap ring 30. Electrically conductive shunt washer 25' thus rotates with rotor shaft 14, and material 27' slides along the circumferential surface of housing 12.

Figures 3, 4A, 4B, 5:
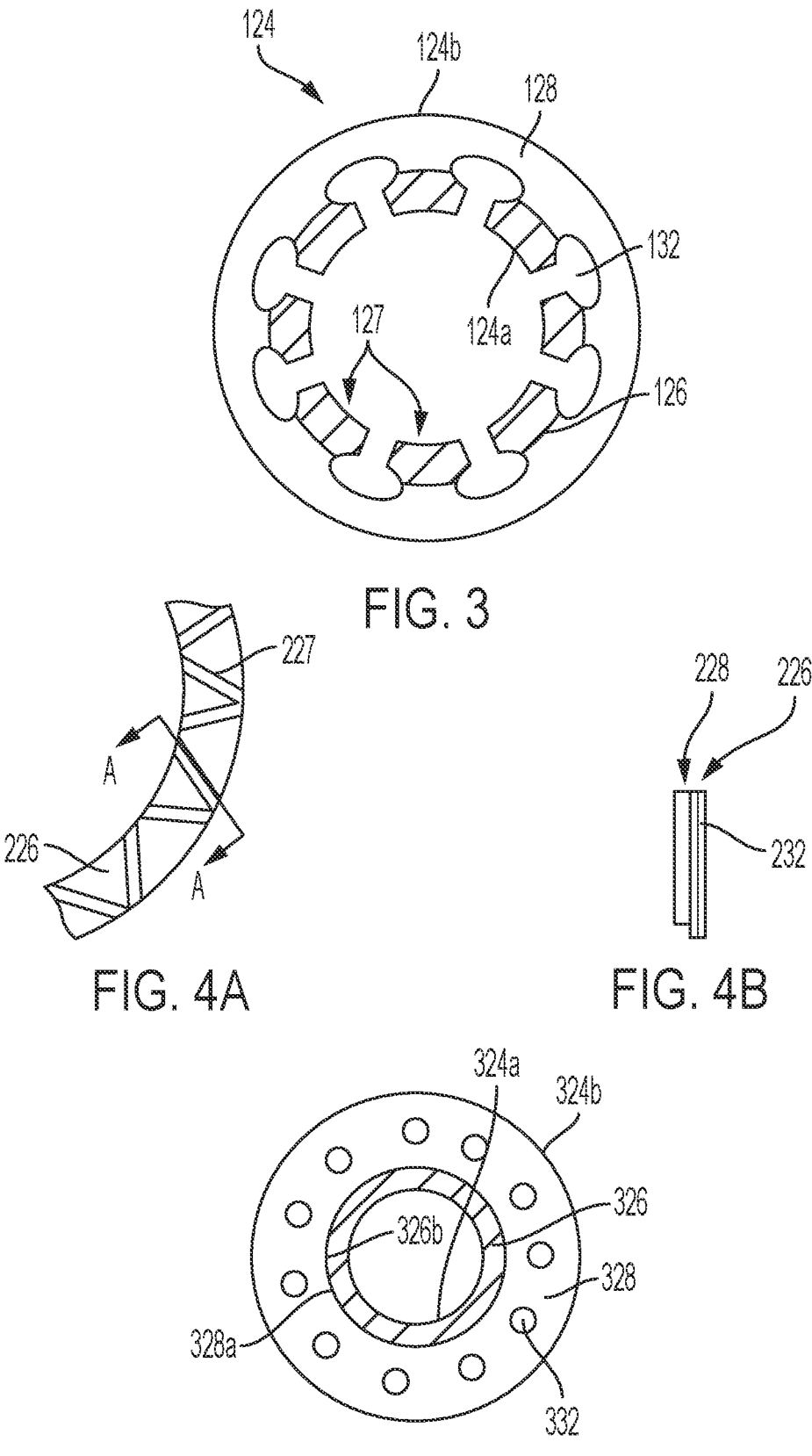
FIG. 3 shows a further example of an electrically conductive shunt washer in accordance with the present disclosure.
FIGS. 4a, 4b shows a further example of an electrically conductive shunt washer in accordance with the present disclosure.
FIG. 5 shows a further example of an electrically conductive shunt washer in accordance with the present disclosure.

FIG. 3 shows a further example of an electrically conductive shunt washer 124 in accordance with the present disclosure. As with the examples of FIGS. 1a and 2c, electrically conductive shunt washer 124 includes a nonwoven material 126 and a rigid support 128 joined together by adhesive, with nonwoven material 126 forming a rotor-side circumferential surface 124a of electrically conductive shunt washer 124 and rigid support 128 forming a housing-side circumferential surface 124b of electrically conductive shunt washer 124. Rigid support 128 is formed as a continuous ring, and nonwoven material 126 is formed by a plurality of circumferentially spaced pads 127 extending radially inward from rigid support 128. Fluid flow holes 132 are formed circumferentially between pads 127. Nonwoven material 126 and rigid support 128 are formed of the same materials as material 26 and rigid support 28, and can be manufactured in the same way.

FIGS. 4a, 4b shows a further example of an electrically conductive shunt washer 224 in accordance with the present disclosure. As with the examples of FIGS. 1a to 3, electrically conductive shunt washer 224 includes a nonwoven material 226 and a rigid support 228 joined together by adhesive, with nonwoven material 226 forming a rotor-side circumferential surface 224a of electrically conductive shunt washer 224 and rigid support 228 forming a housing-side circumferential surface 224b of electrically conductive shunt washer 224. Both nonwoven material 226 and rigid support 228 are formed as a continuous ring, and nonwoven material 226 includes a plurality of radially extending fluid flow grooves 232, which also extend circumferentially, formed in a bearing facing surface 226a of nonwoven material 226. Nonwoven material 126 and rigid support 128 are formed of the same materials as material 26 and rigid support 28, and can be manufactured in the same way.

FIG. 5 shows a further example of an electrically conductive shunt washer 324 in accordance with the present disclosure. As with the examples of FIGS. 1a to 3b, electrically conductive shunt washer 324 includes a nonwoven material 326 and a rigid support 328 joined together by adhesive, with nonwoven material 326 forming a rotor-side circumferential surface 324a of electrically conductive shunt washer 224 and rigid support 328 forming a housing-side circumferential surface 324b of electrically conductive shunt washer 324. Both nonwoven material 326 and rigid support 328 are formed as a continuous ring. To allow fluid to flow through shunt washer 324, the shunt washer 324 can include a plurality of holes 332 extending axially therethrough. Specifically, holes 332 are formed in rigid support 328. As with the example of FIGS. 3a, 3b, adhesive is applied to a housing-side circumferential surface 326a of nonwoven material 326 and/or a rotor-side circumferential surface 328b of rigid support 328, and surfaces 328a, 326b are joined together. Nonwoven material 326 and rigid support 328 are formed of the same materials as material 26 and rigid support 28, and can be manufactured in the same way.

REFERENCE NUMERALS 10 electric axle
12 housing
12a circumferential surface
14 rotor shaft
14a circumferential surface
16 center axis
18 bearing
20 first raceway
22 second raceway
24 electrically conductive shunt washer
24a rotor-side circumferential surface
24b housing-side circumferential surface
26 nonwoven material
26a housing-side circumferential surface
26b rotor-side circumferential surface
28 rigid support
28a housing-side circumferential surface
28b rotor-side circumferential surface
30 snap ring
32 holes
124 electrically conductive shunt washer
124a rotor-side circumferential surface 124b housing-side circumferential surface
126 nonwoven material
127 plurality of circumferentially spaced pads
128 rigid support
132 fluid flow holes
224 electrically conductive shunt washer
224a rotor-side circumferential surface
224b housing-side circumferential surface
226 nonwoven material
226a bearing facing surface
228 rigid support
232 fluid flow grooves
324 electrically conductive shunt washer
324a rotor-side circumferential surface
324b housing-side circumferential surface
326 nonwoven material
326a housing-side circumferential surface
326b surfaces
328 rigid support
328a surfaces
328b rotor-side circumferential surface
332 plurality of holes

What is claimed is:

1. A drivetrain assembly for an electric vehicle comprising:
a housing;
a rotor shaft of an electric motor rotatable about a center axis;
a bearing rotatably supporting the rotor shaft with respect to the housing, the bearing including a first race on the housing and a second race on the rotor shaft; and
an electrically conductive shunt washer configured for creating an electrical path from the housing to the second race, the electrically conductive shunt washer including a material including electrically conductive fibers;
the material further including a solid lubricant.

2. The drivetrain assembly for an electric vehicle as recited in claim 1 wherein the material axially contacts one of the first race and the second race.

3. The drivetrain assembly for an electric vehicle as recited in claim 1 wherein the material contacts a circumferential surface of one of the rotor shaft and the housing.

4. The drivetrain assembly for an electric vehicle as recited in claim 1 wherein the electrically conductive shunt washer includes a rigid support, the material being fixed to the rigid support.

5. The drivetrain assembly for an electric vehicle as recited in claim 4 wherein the electrically conductive shunt washer contacts at least one of the housing and the first race.

6. The drivetrain assembly for an electric vehicle as recited in claim 5 wherein one of the rigid support and the material contacts at least one of the housing and the second race.

7. The drivetrain assembly for an electric vehicle as recited in claim 4 wherein the material and the rigid support are spaced apart from a circumferential surface of one of the rotor shaft or the housing.

8. The drivetrain assembly for an electric vehicle as recited in claim 7 wherein the material further includes supporting fibers and a binder.

9. The drivetrain assembly for an electric vehicle as recited in claim 8 wherein material is a nonwoven material and a solid lubricant, the electrically conductive fibers and the supporting fibers are intermeshed together to form a base including pores, the binder being embedded in the base and filling the pores.

10. The drivetrain assembly for an electric vehicle as recited in claim 8 wherein the supporting fibers are cellulose fibers and/or aramid fibers.

11. The drivetrain assembly for an electric vehicle as recited in claim 8 wherein the material comprises, by weight percent, 10 to 20% of the solid lubricant, 10 to 55% of the electrically conductive fibers, 5 to 30% of supporting fibers and 25 to 35% of a binder.

12. The drivetrain assembly for an electric vehicle as recited in claim 4 wherein the material is fixed to the rigid support by an adhesive.

13. The drivetrain assembly for an electric vehicle as recited in claim 8 wherein spaces are provided between the adhesive for the electrical path to flow between the material and the rigid support.

14. The drivetrain assembly for an electric vehicle as recited in claim 1 wherein the solid lubricant is graphite and/or molybdenum disulfide.

15. The drivetrain assembly for an electric vehicle as recited in claim 1 wherein the electrically conductive fibers are carbon fibers and/or metal fibers.

16. The drivetrain assembly for an electric vehicle as recited in claim 1 wherein the electrically conductive shunt washer includes a plurality of fluid flow holes or grooves formed therein.

17. A method of constructing a drivetrain assembly for an electric vehicle for a motor vehicle comprising:
rotatably supporting a rotor shaft of an electric motor for rotation about a center axis with respect to a housing by a bearing rotatably supporting the rotor shaft with respect to the housing, the bearing including a first race on the housing and a second race on the rotor shaft; and
installing an electrically conductive shunt washer on a circumferential surface of the rotor shaft, the electrically conductive shunt washer being configured for creating an electrical path from the housing to the second race, the electrically conductive shunt washer including a material including electrically conductive fibers.

18. The method as recited in claim 17 further comprising creating the material by:
providing a base including a solid lubricant and the electrically conductive fibers;
saturating the base with a binder; and
curing the binder.

19. The method as recited in claim 18 wherein the base further includes supporting fibers,
the material comprising, by weight percent, 10 to 20% of the solid lubricant, 10 to 55% of the electrically conductive fibers, 5 to 30% of supporting fibers and 25 to 35% of a binder.

20. A drivetrain assembly for an electric vehicle comprising:
a housing;
a rotor shaft of an electric motor rotatable about a center axis;
a bearing rotatably supporting the rotor shaft with respect to the housing, the bearing including a first race on the housing and a second race on the rotor shaft; and
an electrically conductive shunt washer configured for creating an electrical path from the housing to the second race, the electrically conductive shunt washer including a material including electrically conductive fibers;

the material contacting a circumferential surface of one of the rotor shaft and the housing.

* * * * *